INVENTOR.
George B. Richards

Feb. 22, 1966  G. B. RICHARDS  3,236,493
PISTON OPERATED VALVE
Filed July 19, 1962  3 Sheets-Sheet 3
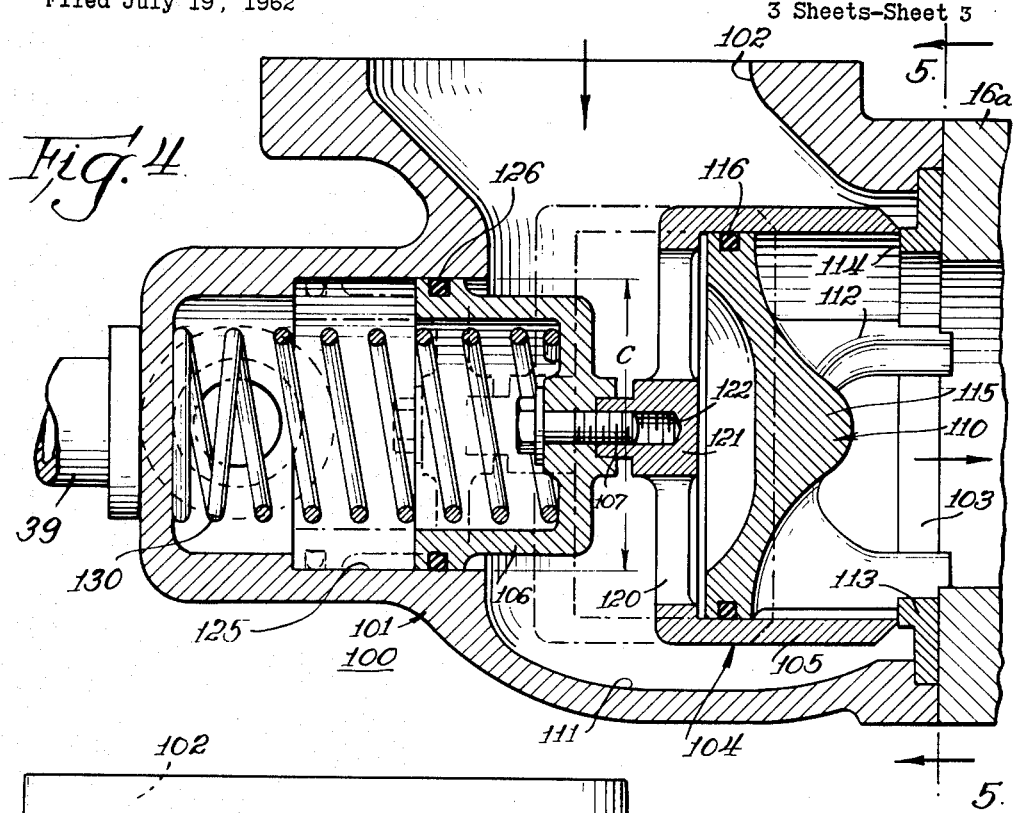
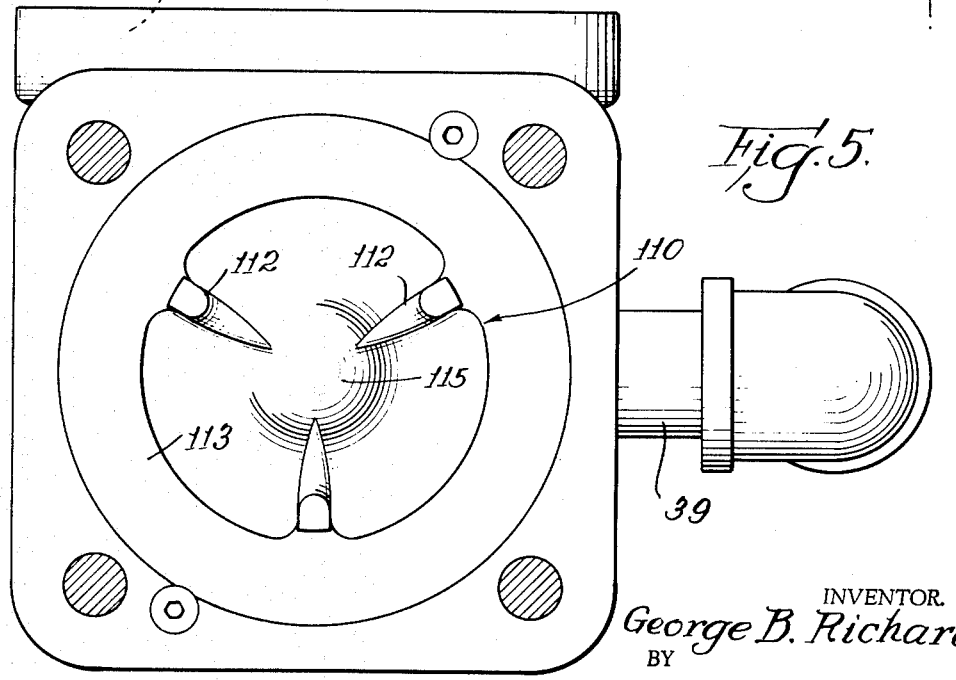
INVENTOR.
George B. Richards
BY
Fidler, Beardsley & Bradley
Attys.

United States Patent Office 3,236,493
Patented Feb. 22, 1966

1

3,236,493
PISTON OPERATED VALVE
George B. Richards, Lake Forest, Ill., assignor to Liquid Controls Corporation, North Chicago, Ill., a corporation of Illinois
Filed July 19, 1962, Ser. No. 211,078
5 Claims. (Cl. 251—62)

This invention relates to a liquid transmission system including apparatus for collecting and exhausting from such system foreign fluids immiscible with and having a different specific gravity than the liquid intended to be transmitted, and for temporarily interrupting transmission in the event of accumulation within the system of a predetermined quantity of such foreign fluid. It is an object of the invention to provide an improved liquid transmission system of such character.

Many liquid transmission systems include a positive displacement meter for measuring the flow through the system. Where a foreign fluid is present, as for example a gaseous material or a liquid other than the primary liquid, the meter will measure such foreign fluid along with the primary fluid and hence provide a false indication of the quantity of the primary liquid passing through the system. Also, it is often desirable that the foreign fluid be prevented from passing through the system. Moreover, where a pump is connected on the downstream side of a tank it is desirable to prevent air or other gas from entering the pump and causing loss of priming. To prevent the passage of the foreign fluid an air eliminator or a liquid segregator is installed in the system which collects the foreign fluid and discharges it from the system or in certain cases returns it to the system ahead of the meter. It has been found that under certain conditions the rate of flow of the foreign fluid is so great that it cannot be collected and discharged from the air eliminator or liquid segregator at a sufficiently rapid rate and some of it passes through the system. It is therefore desirable to cut off the flow of the fluid in the system until the foreign fluid can be collected and discharged.

In my U.S. Patent No. 2,992,757 a liquid transmission system is disclosed and claimed having a means such as an air eliminator or liquid segregator for collecting a foreign fluid and for discharging it back to a supply tank or back to the system downstream from the meter so that it does not pass through the meter. Means including a shut-off valve are provided which automatically halts the flow of fluid through the system when a predetermined quantity of foreign fluid is collected in the air eliminator or segregator and then discharged so that no foreign fluid can flow through the meter. However, the shut-off valve is not reopened automatically but must be reset after each closing operation.

In my copending application, Serial No. 730,148, filed April 22, 1958, now Patent No. 3,083,874, issued April 2, 1963, assigned to the same assignee as this application, there is disclosed a system including inter alia a meter, an air eliminator and a shut-off valve which is closed automatically by the pressure of the discharged foreign fluid thereby to halt the fluid flow through the system when a predetermined quantity of foreign fluid is collected and such fluid is discharged. In this system the valve is automatically opened after the discharge of the foreign fluid so that no resetting operation is required. However, the valve is of such construction that the liquid flowing into the valve casing impinges upon the movable valve element in a direction to open the valve and to hold it open until it is closed by the pressure of the discharged fluid. Thus in order to close the valve it is necessary not only to overcome the pressure of the fluid in the valve casing but also the kinetic energy of the fluid flowing into the casing and impinging upon

2 the valve element. Moreover, where the fluid is caused to flow through the system by a pump of a type which causes pulsations in the fluid pressure such pulsations will cause oscillation of the movable valve element. Where, as in my aforesaid patent application a spring is provided for urging the valve closed, the period of the spring may be such that a resonant condition is set up and severe oscillation occurs. Any undue oscillation of the movable valve element will cause undue wear on the seal or seals forming a piston of the valve.

In accordance with the preferred embodiment of the invention a float chamber forming a portion of an air eliminator or liquid segregator is connected to the system at a point subjected to substantial line pressure, this chamber serving to collect foreign fluid by virtue of difference in specific gravity between the foreign fluid and the liquid intended to be transmitted. Restricted bleeding or exhaustion of the foreign fluid from this chamber is permitted by a valved opening, the valve being under the control of a float which is of such effective specific gravity as to seek the plane of demarcation between the liquid and the foreign fluid. When the foreign fluid accumulates to a predetermined amount, the float opens the valve to permit exhaustion of the foreign fluid. When the foreign fluid is reduced in quantity below a predetermined amount, the float causes closing of the exhaust valve. Preferably the exhausted foreign fluid is fed back to a container of the primary liquid in order that any primary liquid which might be exhausted with the foreign fluid may be recovered.

A valve is arranged in series in the liquid transmission system downstream of the float chamber for interrupting liquid transmission. This valve is urged in an opening direction by line pressure but is closeable by a fluid control pressure equal to the line pressure. The valve is movable between open and closed position in a direction which is transverse to and preferably substantially perpendicular to the direction of flow of fluid into the valve housing whereby the valve is urged open entirely or substantially entirely by the pressure of the fluid in the valve housing and is not urged open by the kinetic energy of the fluid flowing into the casing. The valve may be biased toward closed position by any suitable means or may be subject to force amplifying means such that a control pressure equal to the line pressure will cause the valve means to close. The valve is automatically openable by line pressure when the control pressure is substantially reduced.

Fluid at the control pressure is fed to the valve means through a second control valve in the float chamber. This second control valve is also operated by the float such that accumulation within the float chamber of a predetermined quantity of foreign fluid causes opening of this second control valve, whereby the foreign fluid, at line pressure, is fed to the valve means, temporarily interrupting liquid transmission. When the excessive accumulation of foreign fluid has been sufficiently exhausted through the first-mentioned control valve, the float causes closing of the control valves. The control pressure is then relieved through a small bleeder passage such that the valve means may again open under the influence of line pressure to permit resumption of liquid transmission.

The liquid transmission system therefore includes apparatus for interrupting transmission upon accumulation of foreign fluid in excess of a predetermined amount, and is self-recovering such that when the accumulated foreign fluid has been reduced in quantity transmission is automatically resumed.

Such a system is particularly desirable in instances wherein a single operator is preferably stationed at a substantial distance from the basic liquid transmission system.

One such example is that of a fuel delivery truck, the single operator preferably being stationed at the actual point of delivery such that he may protect against overflow of the receiving receptacle. It will be apparent that if the basic liquid transmission system is capable of exhausing an excessive accumulation of foreign fluid and automatically resuming liquid transmission, the operator need not leave his station to reactuate the system.

Another object of the invention is to provide an improved liquid transmission system in which means are provided not only for eliminating a foreign fluid and interrupting transmission of the primary liquid in the event of an excessive accumulation of foreign fluid, but for automatically reestablishing transmission of the primary liquid when the accumulation of foreign fluid has been reduced to a predetermined quantity.

Another object is to provide an improved liquid transmission system having means for collecting and discharging from the system a foreign fluid immiscible with the primary fluid and a shut-off valve which is normally opened by the pressure of the primary fluid and closed by the pressure of the discharged foreign fluid and wherein the shut-off valve operates independently of the kinetic energy of the primary fluid impinging there against.

Another object is to provide an improved liquid transmission system having means for collecting and discharging from the system a foreign fluid immiscible with the primary fluid and a shut-off valve which is normally opened by the pressure of the primary fluid and closed by the pressure of the dicharged foreign fluid and wherein the shut-off valve is not subject to oscillation resulting from pulsations in the pressure of the primary fluid.

A further object of the invention is to provide an improved liquid transmission system having various of the characteristics described above which operates satisfactorily as employed with a pressurized tank, a gravity flow system, or a system employing a pump.

Still another object of the invention is to provide an improved liquid transmission system having various of the characteristics described above while being reliable in operation, efficient, and inexpensive to manufacture.

This invention, together with further objects and advantages thereof, will best be understood by reference to the following description taken in connection with the accompanying drawings wherein:

FIG. 4 is an enlarged, fragmentary, cross-sectional view of a second form of shut-off valve suitable for use in the system shown in FIGS. 1–2; and FIG. 5 is a view taken along line 5—5 of FIG. 4.

A liquid transmission system incorporating the present invention may be applied to a fuel delivery truck (not shown). The truck includes a supply tank (not shown), which may be compartmentalized, and a can box (not shown) located on the curb side of the truck and containing the major portion of the liquid transmission system constituting the present invention.

Figure 1:
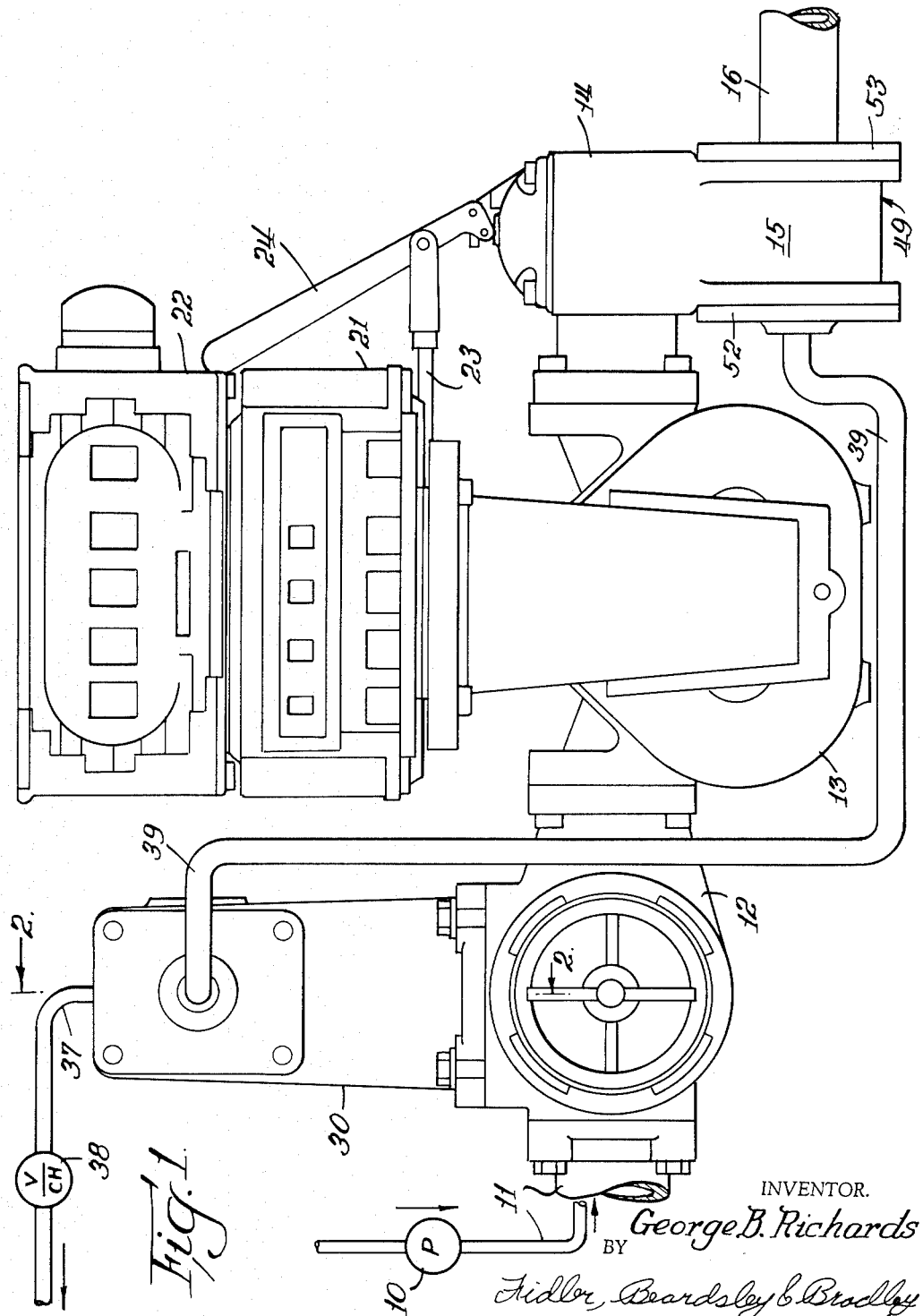
FIG. 1 is an elevational view of a liquid transmission system illustrating one embodiment of the invention.

The liquid transmission system is shown in FIG. 1. In this preferred embodiment it includes a pump 10 and a conduit 11 leading to a strainer 12. The strainer is shown directly connected to a meter 13 preferably of the rotary positive displacement type, which is in turn directly connected to a cutoff valve 14 (not shown in detail). Liquid passes out of the bottom of the cutoff valve 14 to a pressure operated shut-off valve 15 and from there to a discharge conduit 16. The conduit 16 may connect to a flexible hose (not shown) or other final delivery conduit, and the inlet of the pump 10 is suitably connected to the supply tank. As indicated above the pump 10 may be omitted in favor of gravity flow or a pressurized tank.

Mounted on top of the meter 13 are a known type of preset counter 21 and a known type of register 22. The preset counter 21 is connected by a suitable link 23 to the operating handle 24 of the cutoff valve to interrupt flow after delivery of a predetermined amount of liquid. The apparatus for temporarily interrupting liquid transmission in the event of the accumulation of an excessive quantity of foreign fluid includes primarily control apparatus mounted on the strainer 12, and the pressure operated shut-off valve 15 arranged immediately below the cutoff valve 14.

Figure 3:
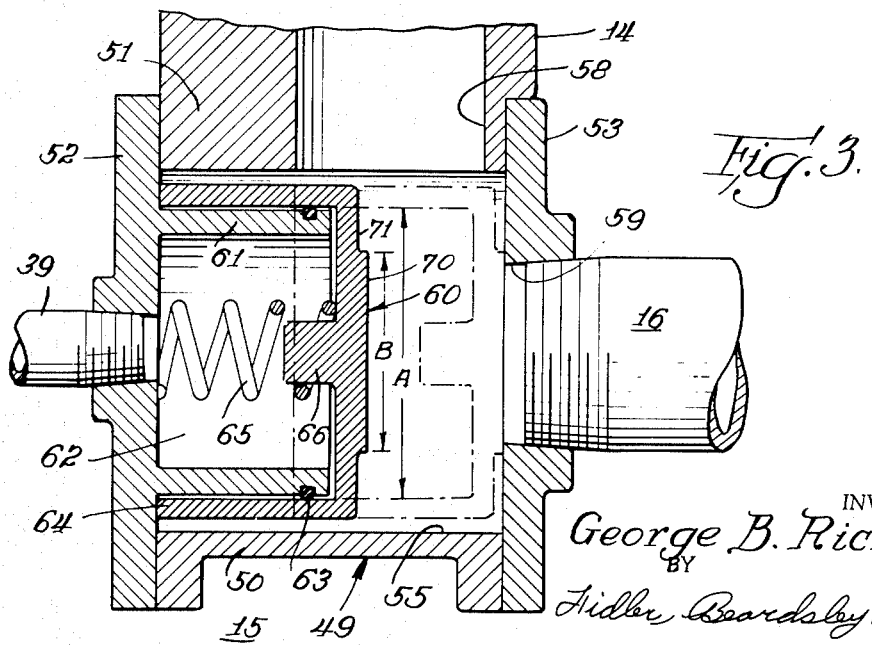
FIG. 3 is an enlarged, fragmentary, cross-sectional view of one form of shut-off valve suitable for use in the system shown in FIGS. 1–2.

The control apparatus mounted on the strainer 12 includes an air eliminator or liquid segregator which may be similar to that disclosed in United States Patent No. 3,021,861, dated February 20, 1962 and best seen in FIG. 3. The air eliminator includes a housing 30 forming a float chamber. On opposite sides of the housing 30 adjacent the top thereof are a pair of openings which are substantially closed by plates 31 and 31a, respectively. Each of these plates has an orifice therein designated 32 and 32a, respectively.

Figure 2:
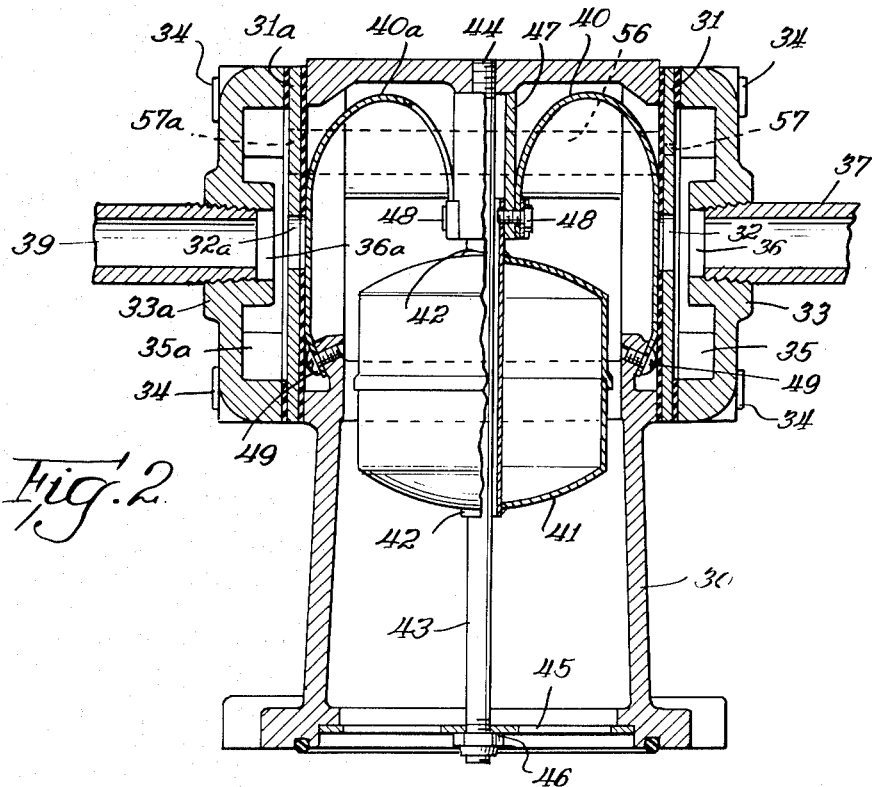
FIG. 2 is a cross-sectional view of certain control apparatus included in the system of FIGURE 1.

Immediately outside the plates 31 and 31a are respective end plates 33 and 33a. These end plates are secured to the housing 30 by any suitable means such as screws 34, and clamp the plates 31 and 31a respectively against the housing. The end plates 33 and 33a are flanged as shown such that chambers 35 and 35a are formed between the plates 31 and 31a and the respective end plates 33 and 33a. The plates 33 has a tapped opening 36 therein in which a pipe 37 is threaded, this pipe leading through a check valve 38 (FIG. 2) back to the tank 7. The end plate 33a has a tapped opening 36a therein in which a pipe 39 is threaded, this pipe leading to the pressure operated valve 15 for reasons explained below. The float chamber defined by the housing 30 is therefore connected through the orifices 32 and 32a to the chambers 35 and 35a and to the pipes 37 and 39 respectively.

The orifices 32 and 32a are preferably quite narrow but of significant length in a vertical direction, for example, ¼″ in width and ¾″ in length.

These orifices may be covered or closed by corresponding reed-type valve members 40 and 40a. The valve members are controlled by a float 41 consisting in part of a hollow tube 42 extending through the center thereof. This tube loosely receives a rod 43 whose upper end threadedly engages a threaded opening 44 in the top of the housing 30. The opening 44 is tapered, whereby a tight seal is attained at this point. The lower end of the rod 43 extends through a central opening in a spider 45 and is threaded to receive nut 46 whereby the rod is held firmly in place. The float 41 is free to slide up and down the rod 43 in response to the forces acting thereon.

The tube 42 extends upwardly beyond the float 41 and into a central bore in a block 47. This block is secured to the tube 42 by a pair of screws 48 which threadedly engage the block 47 and bear against or extend into the tube 42. The block 47 is thereby arranged to move with the float 41.

Each of the reed valve members 40 and 40a, referred to above, has one end secured to the block 47 by the screws 48. The extremities of these reeds are preferably doubled over the heads of the screws 48 such that the reeds are more firmly secured against rotation with respect to the block 47. The faces of the block 47 against which the reeds 40 and 40a are thus made to bear, are preferably at least as wide as the reeds.

The reeds extend upwardly, from their point of securing to the block 47, and are doubled over to extend downwardly past the corresponding orifices 32 and 32a, their other ends being secured to the housing 30 by screws 49. Preferably the portions of the housing engaged by the lower ends of the reeds are sloping, as shown, such that reeds are biased against the respective plates 31 and 31a.

It will now be seen that when the float 41 and the associated apparatus are in the raised position illustrated in FIG. 3, the reeds 40 and 40a will cover and close the respective orifices 32 and 32a. When the float moves downwardly from the position shown in FIG. 2, the reeds will be made gradually to peel away from the plates 31 and 31a to open the orifices from the top down.

In order that the reeds 40 and 40a may more effectively close the orifices 32 and 32a the inner faces of the plates 31 and 31a may be covered in any suitable manner by a resilient material, such as a plastic. Such lining or coating should not, of course, obstruct the orifices.

The housing 30 and the associated float-operated control valves are shown oriented in the drawings in such a manner as to permit the extraction or elimination from the system of air or other foreign fluid which is immiscible with and of lower specific gravity than the primary liquid intended to be transmitted by the system. When air, for example, is carried into the system along with liquid, for example, the air will rise in the housing 30, displacing liquid normally contained therein. The float 41 is of such effective specific gravity (in view of all forces acting thereon) that it will float on the liquid and sink in the foreign fluid which the apparatus is intended to eliminate. In other words, the float seeks the plane of demarcation between the liquid and the foreign fluid. As air or other foreign fluid of low specific gravity accumulates within the upper portion of the housing 30, the float 41 descends, a sufficient accumulation of air causing the opening of the two control valves. As air is eliminated from the system the level of the liquid within the float chamber will rise and will lift the float such that the valves will again be closed.

As previously described, the orifice 32 and the chamber 35 are connected by a conduit 37, through a check valve 38, back to the tank 7 whereby the foreign fluid may be removed from the liquid transmission system. Also, any liquid which might be carried off with the foreign fluid is carried back to the supply tank. In any event the foreign fluid is discharged from the conduit formed by the apparatus connected to the tank so that the foreign fluid does not reenter the conduit except as it may be drawn into the conduit again from the tank. If desired the foreign fluid may be discharged to some other point externally of the conduit.

As previously described, the orifice 32a and the chamber 35a are connected by a conduit 39 with the pressure responsive shut-off valve 15, FIG. 1. The shut-off valve 15 has a housing 49 including a main housing 50, a top member 51 and end members 52 and 53. The housing is suitably secured to the bottom of the cutoff valve 14. The housing 49 defines a valve chamber 55 and the top member 51 has an inlet 58 communicating with the interior of the valve 14 and leading into the chamber 55. An outlet 59 leads from the chamber 55 and communicates with the discharge conduit 16. The inlet 58 and the outlet 59 are disposed in perpendicular or substantially perpendicular relation as will hereinafter be explained.

Slideable in the chamber 55 is a movable valve element 60 which is adapted to be moved between an open position (as shown in full lines) and a closed position (as shown in broken lines) closing the outlet. The movable valve element 60 is of cup shape and is slideable over a cylindrical flange 61 projecting inwardly from the inner wall of the end plate 52 to define an auxiliary chamber 62 into which the pipe 39 leads. O-ring seal 63 is provided in the outer face of the flange 61 which cooperates with the flange 64 of the movable valve element 60 to seal the chamber 62.

The movable valve element 60 is urged toward closed position by a spring 65 seated against the inner wall of the end plate 52 and engaged over a stud 66 extending inwardly from the inner face of the movable valve element 60.

When liquid flows through the valve housing 49 from the inlet to the outlet the pressure of the liquid on the outer (righthand) face of the movable valve element 60 creates a force urging the movable valve element 60 open which is greater than the closing force which is exerted by the spring 65 and thus the movable valve element remains open. The closing force applied to the valve element 60 by the spring 65 is preferably small compared to the opening force exerted by the liquid pressure. Accordingly, if the chamber 62 has merely atmospheric pressure therein the line pressure of the liquid will hold the valve element 60 in open position against the action of the spring 65. When a predetermined quantity of foreign fluid has been collected in the air eliminator the float 41 will fall and open the orifice 32 to discharge foreign fluid from the air eliminator. At the same time the orifice 32a is opened whereby the pressure of the foreign fluid in the air eliminator is transmitted through the pipe 39 to the auxiliary chamber 62 and such pressure is applied to the valve element 60 in a closing direction. Since the pressure of the liquid in the valve chamber 55 is line pressure and the pressure on the foreign fluid in the auxiliary chamber 62 is equal to the line pressure the spring 65 will move the valve element 60 to closed position.

A bleeder orifice is preferably provided to permit the reduction of pressure within the chamber 62 when the orifice 32a is again covered by the reed 40a, that is, after air has been withdrawn from the system through the conduit 37 to permit the rising of the float 41. In the illustrated embodiment of the invention this orifice is provided within the housing 30. More specifically, a passage 56 is provided through a thick portion of the wall of the housing 30, and openings 57 and 57a are provided in the plates 31 and 31a respectively in alignment with the passage 56. The opening 57 in the plate 31 is of very small diameter, for example, 1/32", in order that the net effect of this passage between the compartments 35 and 35a is that of a bleeder orifice. More specifically, the orifice 57 should be small compared to the orifice 32a. This bleeder orifice may be omitted if a small clearance is provided between the valve element 60 and the guide member 61, as by omitting the illustrated O-ring. However, the passage 56 and bleeder orifice 57 are preferred, as the size of the opening may thereby be more accurately controlled.

When an operator wishes to initiate operation of the liquid transmission system described above in its preferred embodiment, he starts the pump 10, sets the present counter 21, and opens the cutoff valve 14. He may then carry the nozzle end of the hose to the actual point of delivery. Fuel will begin to flow when he opens the nozzle valve at the end of the hose.

If air or other foreign fluid lighter than the primary fluid should for any reason be present in the primary fluid as it passes the float chamber, it will rise in the float chamber and accumulate at the top. If this accumulation of air is gradual, the orifices 32 and 32a will be uncovered gradually by descent of the float 41. The air may then be eliminated gradually through the upper portion of the orifice 32 into the chamber 35 and through the conduit 37 back to the tank. The major portion of the pressure drop will be across or through the orifice 32 whereby the pressure in the chamber 35 will be only slightly above atmospheric pressure. There will also be a small flow of air through the upper portion of the orifice 32a into the chamber 35a. If this flow is sufficiently small, pressure in the chamber 35a may be maintained only slightly above atmospheric pressure by virtue of the air bleeding through the passage 56 and the orifice 57 into the chamber 35. Under these circumstances the pressure responsive valve 15 would not close, even temporarily.

If the accumulation of air at the top of the float chamber is rapid, the float 41 will drop a greater distance and completely uncover the orifices 32 and 32a or at least a larger portion thereof. In such case there will be a larger flow of air into the chamber 35a such that it cannot be relieved by the bleeder opening 57. Accordingly, line pressure will be applied to the conduit 39 and to the chamber 62 such that the fluid pressures acting on the valve element 60 are substantially balanced, and the spring 65 will cause the valve to close temporarily.

If preferred, a faster rate of exhaust of the foreign fluid may be obtained without interruption of liquid transmission by arranging the orifice 32 higher in the wall of the housing. This orifice may then be largely or completely open, to permit a substantial exhaust flow, before the orifice 32a opens. The valve 15 will then not be closed unless the orifice 32 is incapable of exhausting the foreign fluid at the rate at which it is accumulating.

At such time as the excess foreign fluid within the housing 30 has been relieved through the orifice 32 and the pipe 37 back to the tank, the float will again rise and close the orifices 32 and 32a. The pressure in the chamber 35a and hence in the chamber 62 of the pressure responsive valve 15 will then be relieved through the passage 56 into the chamber 35 and to the tank such that line pressure acting on the movable valve element 60 will reopen the valve 15.

It will be seen that the liquid flows into the valve chamber 55 through the inlet 58 in a direction perpendicular to the direction of movement of the valve element 60 between its open and closed positions. Thus, regardless of the position of the valve element 60 the incoming liquid impinges against the side wall of the valve element 60 and not against the end wall. Accordingly, the force necessary to close the valve element 60 is only that which is necessary to overcome the pressure of the liquid in the valve chamber 55 on the end face of valve element 60. The arrangement is such that it is not necessary to overcome the kinetic energy of the liquid impinging against the valve element 60 in order to close the valve.

The valve element 60 is formed in its outer (righthand) face with a circular boss having a face 70 which has a diameter (indicated at B) slightly greater than the element 59 so that when the valve element 60 is in closed position it completely closes the outlet. The remainder 71 of the outer (righthand) face is of annular shape and is depressed below the face portion 70 whereby liquid can enter between the inner face of the end wall 53 and the face 71 even when the valve element 60 is in closed position. Thus, when the foreign fluid has been completely discharged from the air eliminator and atmospheric pressure is reestablished in the auxiliary chamber 62 the pressure of the liquid against the face 71 urges the valve element 60 to open position. It will be seen that the liquid pressure within the chamber 55 is effective against the valve element 60 over an annular area equal to the difference in the diameter (B) of the face 70 and the diameter (A) of the inner wall surface of the flange 64. This area is such that when line pressure is applied thereto the force tending to urge the valve 60 toward open position is greater than the closing force of the spring 65.

Referring now to FIGS. 4 and 5 there is shown an alternate form of valve which may be substituted for the valve 15 in the system shown in FIG. 1. The construction is such that the valve housing is somewhat smaller and more compact than the housing of the valve shown in FIGS. 1 and 3.

The valve 100 comprises a casing 101 having an inlet 102 and an outlet 103. The valve 100 is suitably secured under the valve 14 and with its inlet 102 communicating with the outlet of the valve 14 and with its outlet communicating with the discharge conduit 16a.

A movable valve element 104 is formed with a valve portion 105 and a piston portion 106 which may be formed integral but preferably are formed in two parts and are connected by a screw 107 as shown.

The valve portion 105 is of generally cylindrical form and is slidable over a valve seat element 110 which is supported in the valve chamber 111 adjacent the outlet 103. To this end valve seat 110 is provided with a plurality of legs 112 which are secured to an outlet plate 113 supported in the housing 101 and thereby defining a plurality of ports 114 which provide communication between the chamber 111 and the outlet 103. The valve seat member 110 also has a body 115 of generally dish shape over which the valve portion 105 slides between closed position (shown in full lines) closing the ports 114 and open position (shown in broken lines) exposing the ports. An O-ring seal 116 is provided in the periphery of the portion 115 forming a seal between such portion and the valve portion 105.

The valve portion 105 has plurality of ribs 120 connected to a hub 121 having a threaded socket 112 in which the screw 107 is threaded.

The piston portion 106 is of generally cup shape and slides in an auxiliary chamber 125 formed in an extension of the casing 101, the piston portion 106 being movable with the valve portion 105 between closed position (shown in full lines) the open position (shown in broken lines). An O-ring seal 126 is carried by a peripheral flange on the piston portion 106 for providing a seal between the piston portion 106 and the wall of the auxiliary chamber 125. A spring 130 is seated between the end wall of the chamber 125 and the interior face of the end wall of the piston 106 to urge the valve element 104 toward closed position.

The pipe 39 which leads from the air eliminator 30 (FIG. 2) leads into the auxiliary chamber 125 to supply foreign fluid thereto when the orifice 32a is opened.

It will be seen that the inlet 102 is disposed generally perpendicularly to the axis of movement of the valve element 104 whereby the flow of liquid into the chamber 111 is essentially perpendicular to the axis of movement of the valve element. Thus, the force of the liquid impinging on the valve element does not substantially tend to urge the valve element either toward open or closed position. It will be noted, however, that the inlet 102 is somewhat inclined toward the axis to provide a more streamline flow through the casing 101. However, the inclination is not so great as to cause any serious interference with the opening or closing of the valve.

The system utilizing the valve of FIGS. 4 and 5 operates in a manner generally similar to the system utilizing the valve of FIG. 3. However, it will be noted that the valve portion 105 is constructed to provide a balanced valve and such portion therefore does not present any resistance to opening or closing movement other than that presented by the friction of the seal 116. The valve element 104 is maintained in open position when line pressure is applied thereto, such line pressure being effective over the outer face of the piston portion 106 and the inner (righthand) face of the hub 121. In other words, the line pressure, that is the pressure of the liquid in the chamber 111, is effective over an area having a diameter indicated by "C" in the drawings. The force urging the valve element open is, of course, substantially greater than the force of the spring urging it closed. However, when the air eliminator operates to discharge foreign fluid therefrom the pressure of such fluid is transmitted through the pipe 39 to the auxiliary chamber 125 and is applied to the inner (left hand) face of the piston portion 106 to substantially balance the force exerted on the valve element by the liquid in the chamber 111. The added force exerted by the spring 130 on the valve element 104 in a closing direction is sufficient, when added to the pressure of the foreign fluid to overcome the force exerted by the liquid pressure whereby the valve element 111 is moved to closing position.

After the discharge of the foreign fluid has ceased and it is bled from the auxiliary chamber 125 so that substantially atmospheric pressure exists in the auxiliary chamber 125 the pressure of the liquid in the chamber 111 will cause the valve element to be moved to open position. In this connection it will be noted that the pressure of the liquid in the chamber 111 is at all times applied to an area on the valve element having the diameter "C." Thus, even if the valve element is in closed position the line pressure is effective to move the valve element to open position.

In the forms of cutoff valve above described, the effective area of the face of the valve which is exposed to liquid pressure in the valve housing is generally the same as the effective area of the face of the valve element which is exposed to the pressure of the foreign fluid. Thus, where the pressure of the foreign fluid is the same as the pressure of the liquid in the valve housing, equal forces are exerted on the movable valve element in opposite directions by the two fluids. Accordingly, it is necessary to utilize means providing an additional force on the movable valve element for moving the valve element to closed position. In the above described embodiments of the valve a spring is used for applying the closing force.

If the foreign fluid to be extracted from the system is heavier than the primary liquid, the float chamber 30 should of course be inverted so that the device functions as a liquid segregator. The heavy foreign fluid will then accumulate in the chamber. The float should still be of such effective specific gravity that it seeks the plane of demarcation between the foreign fluid and the primary liquid. An excessive accumulation of the heavy foreign fluid will then cause the float to rise and open the orifices.

Where a liquid transmission system embodying the present invention is employed as disclosed in the present application, flow of the primary liquid may be produced by a pressurized tank or a pump, or reliance may be placed upon gravity flow. Regardless of the source of pressure for producing the primary flow, the float chamber 30 and the pressure responsive valve 15 should be arranged in the system at points subjected to substantial line pressure. This is necessary in the case of the control apparatus associated with the float chamber 30 since a pressure is desired to cause elimination of the foreign fluid. Where the invention is employed with a gravity flow system, the exhaust conduit for foreign fluid preferably opens into the transmission system downstream of the valve. In the case in which a pump is employed, both the float chamber 30 and the pressure responsive valve 15 should be downstream of the pump and the valve should be downstream of the float chamber, since closing of the valve should not interrupt application of line pressure to the float chamber.

It will be apparent that the invention may be varied in its physical embodiment without departing from the spirit of the invention, and it is desired, therefore, that the invention be limited only by the scope of the appended claims.

I claim:

1. A valve for controllably interrupting the flow of fluid therethrough comprising a housing defining a first chamber having an inlet thereto and an outlet therefrom,
an annular valve seat surrounding said outlet,
a pedestal portion of said housing surrounded by said seat extending perpendicularly to the plane of said seat and having at least one transverse opening therethrough,
a valve element movable in said chamber relative to said seat,
said valve element being tubular and surrounding said pedestal portion of said housing,
said valve element being slidable on said pedestal and sealably connected thereto,
said housing having a bore therein,
a cylindrical piston slidably and sealably disposed in said bore and defining a second chamber isolated from said first chamber,
means connecting said piston to said valve element,
said connecting means being perforated to equalize the pressure on said pedestal with the pressure in said first chamber,
said piston having an effective circular facial area directed toward said outlet and exposed to the pressure in said first chamber in all positions of said valve element,
spring means acting on said valve element in a valve closing direction, and
means for applying a control fluid pressure to said second chamber and to said piston to urge said valve element in a valve closing direction.

2. A valve element as set forth in claim 1 wherein said inlet and said outlet open into said chamber at substantially right angles.

3. A valve element as set forth in claim 2 wherein said bore and said piston are cylindrical and said facial area is equal to the cross-sectional area of the portion of said piston communicating with said chamber.

4. A valve element as set forth in claim 3 wherein an axially disposed post interconnects said piston to said tubular valve element.

5. A valve element as set forth in claim 4 wherein said piston is cup-shaped and opens into said bore, said spring being a coil spring mounted under compression in said bore between said housing and said piston, said spring being partially received in said piston.

References Cited by the Examiner

UNITED STATES PATENTS

| | | | |
|---|---|---|---|
| 770,416 | 9/1904 | Beaumont | 251—44 |
| 2,276,838 | 3/1942 | Grise. | |
| 2,329,323 | 9/1943 | Benz | 137—173 X |
| 2,828,676 | 4/1958 | Barusch | 251—62 X |
| 2,833,299 | 5/1958 | Marriette | 251—43 X |
| 2,872,119 | 2/1959 | Puster | 251—282 X |
| 2,894,659 | 7/1959 | Billeter | 222—72 |

ISADOR WEIL, *Primary Examiner.*

WILLIAM F. O'DEA, *Examiner.*